April 1, 1969   P. H. KARLSSON   3,436,192
CATALYTIC APPARATUS FOR REMOVING SULPHUR DIOXIDE FROM FLUE GAS
Filed June 22, 1964
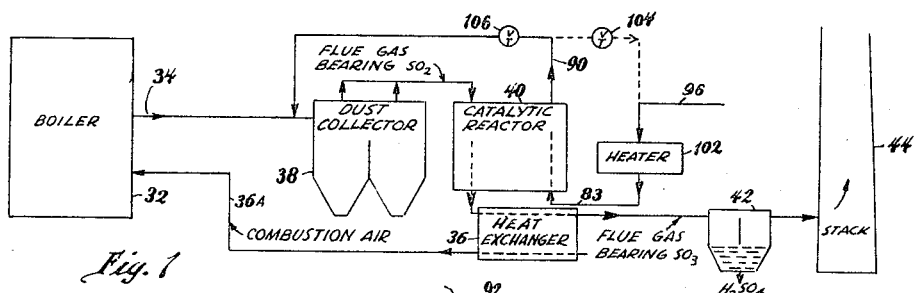
Fig. 1
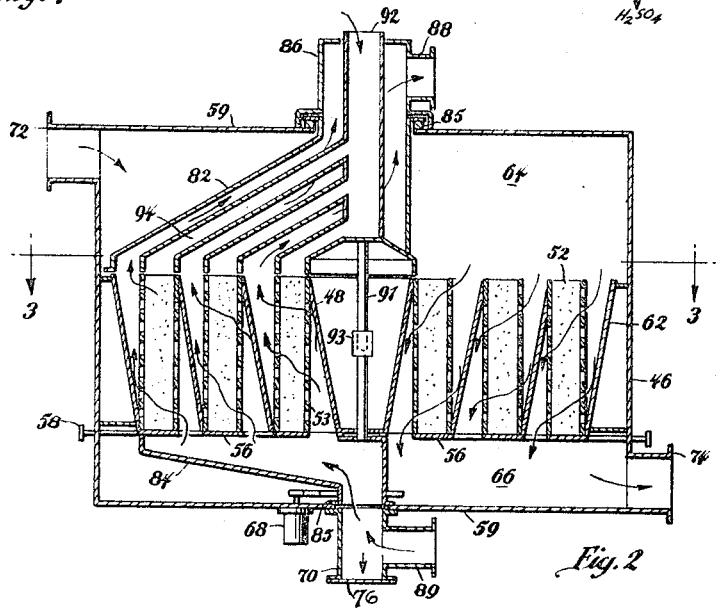
Fig. 2
Fig. 3
INVENTOR.
Per Hilmer Karlsson
BY
Wayne Lang
AGENT

United States Patent Office

3,436,192
Patented Apr. 1, 1969

3,436,192
CATALYTIC APPARATUS FOR REMOVING
SULPHUR DIOXIDE FROM FLUE GAS
Per Hilmer Karlsson, Dobbs Ferry, N.Y., assignor, by mesne assignments, to The Air Preheater Company, Inc., a corporation of Delaware
Filed June 22, 1964, Ser. No. 376,760
Int. Cl. B01j 9/08; B01d 53/34
U.S. Cl. 23—288                    2 Claims

ABSTRACT OF THE DISCLOSURE

A system for the continuous removal of sulphur dioxide from the exhaust gases generated by the combustion of fossil fuels in a boiler furnace. The system includes a sectionalized catalytic reactor to convert sulphur dioxide to sulphur trioxide; the reactor having flue gases passing through one section thereof and a purging gas through a second section thereof, said sections being independent of one another.

---

The present invention relates to the removal of sulphur from gas mixtures, and particularly to a process and apparatus which effects the removal of sulphur dioxide from flue gas exhausting from a boiler furnace.

Various processes developed to remove sulphur products from gas mixtures include that of reducing the oxides of sulphur occurring in such gas mixtures to an elemental form of sulphur that may be removed by a system of filtration. Another process utilizes a predetermined absorbent or adsorbent base which first removes the oxides of sulphur from the gas mixture and then must itself be further treated to remove the sulphur oxides therefrom. It is ample comment on these processes to state that none of them have gained even nominal acceptance by the power generating industry and that vast quantities of untreated sulphur compounds are currently being discharged into the atmosphere.

A recently developed process contemplates the conversion of sulphur dioxide in the gas mixtures to sulphur trioxide by passing them through a reactor containing a suitable catalyst and subsequently converting the sulphur trioxide to sulphuric acid.

This invention is directed to a simple and economic apparatus and process for maintaining the catalyst in the reactor in proper condition for the conversion process and to provide for the removal of spent catalyst from the reactor and for its replenishment with fresh catalyst.

Among other features defined in the following description, my invention embraces various novel arrangements of a system and novel features of a particular apparatus that permit carrying out the foregoing process in an efficient and economic manner.

A better understanding of my invention may be had by referring to the accompanying drawings in which:

FIGURE 1 is a flow diagram of a system embodying my invention,

FIGURE 2 is an enlarged detail drawing of a preferred form of catalytic reactor, and FIGURE 3 is a plan view of the apparatus as seen from line 3—3 of FIGURE 2.

In the drawings hot exhaust gases bearing a quantity of sulphur dioxide are discharged from a boiler 32 through an exhaust duct 34. The hot gases pass on to a dust collector 38, preferably of the electrostatic type, where a large portion of the particulate matter entrained in the gas stream is removed therefrom before it is passed on to a catalytic reactor 40. The reactor 40 contains a discrete form of catalytic material such as vanadium pentoxide that when contacted by the flue gas accelerates the oxidation of sulphur dioxide carried thereby to sulphur trioxide.

After having traversed the catalystic reactor 40, the flue gas now bearing a quantity of sulphur trioxide is directed through the gas side of a heat exchanger 36 which may supply heated air through duct 36a for fuel combustion in boiler 32 through duct 36a. The cooled gas is directed through an acid mist precipitator or similar apparatus 42 after having passed through heat exchanger 36 during which passage $SO_3$ combines with $HO_2$ in the flue gas forming sulphuric acid. The compounds of sulphur are accordingly removed from the flue gas before sulphur-free flue gas is exhausted to the atmosphere through a stack 44.

According to the invention the catalystic reactor 40 comprises a cylindrical outer housing 46 and a central casing 48 concentrically aligned to provide an annular chamber therebetween. The annular chamber is sub-divided by a series of radial partitions 50 into a series of sector-shaped compartments each of which is adapted to house one or more banks of radially spaced cells 52. The cells may be arcuately formed or straight sided in accordance with the dictates of design in order that when considered in their entirety, they comprise an essentially annular series of cells extending completely around the annular chamber.

Each cell is open at its upper end and is closed at its lower end by a series of reciprocating grate type valves 56 which are moved radially by an actuator 58. Thus, when the valve means are effectively "closed" as illustrated in the drawing, each cell is capable of containing a quantity of discrete catalytic material therein, and when the valve means 56 is "opened" by means of actuator 58, the discrete material will fall by gravity to clear the cells. Upon closing the valves 56, the respective cells again become containers for the discrete material.

The walls 53 of the cells 52 are formed of highly perforate material such as metallic screening to permit the radial flow therethrough of the exhaust gas and a purging fluid. To more evenly distribute fluid flow throughout the axial extent of each cell 52, guide vanes 62 are directed diagonally from the top of one cell bank to the bottom of an adjoining cell bank to form supply and exhaust passageways of varying capacity leading to and from each cell.

The housing at each end of the cell bank 46 is extended axially therefrom a distance to provide for upper and lower plenum chambers 64 and 66. The upper chamber 64 has an inlet duct 72 connected thereto for the entrance of raw or untreated gas while the chamber 66 at the lower end of the housing has an outlet duct 74 for the exhaust of treated gas therefrom.

Hood members 82 and 84 having a substantially sectorial cross-sectional configurations are formed with open end faces to confront the open ends of the catalys cells contained in one or more compartment. The outboard end of each hood member is mouned in a bearing member 85 carried by the adjacent end wall 59 of the housing to permit them to rotate about a common vertical axis and simultaneously embrace opposite ends of a predetermined bank of catalyst cells. The upper hood 82 is provided with a tubular extension 86 having a branch duct 88 for connection to an outlet duct 90. The central opening in the lower hood 84 is aligned in sealing relation with an extension 70 having a branch duct 89 for connection to a duct 83 that supplies the purging fluid.

A shaft 91 extending between upper hood 82 and lower hood 84 permits rotating the upper and lower hoods by a single actuating means 68. The shaft 91 is provided with a slip-joint 93 that permits limited axial adjustment of the effective shaft length to accommodate limited thermal distortion of the reactor when it is subjected to elevated operating temperatures.

By this arrangement upper and lower hoods may be rotated in unison about a common vertical axis to direct purge fluid from duct 83 through lower hood 84, upper hood 82 and the intervening cells of catalystic material to thereby purge the catalytic material of its accumulated contaminants. Purging fluid leaving connection 88 of the reactor is thence directed through open valve 106 to duct 34 in advance of the dust collector 38.

The hoods 82 and 84 illustrated are adapted for movement by means 68 to successively embrace each compartment as required to purge the catalytic material or permit its withdrawal and replacement. By circumferentially extending the radial sealing plate 87 at each side of the hood member to cover at least one complete sectorial compartment, the hoods may be readily adapted for continuous rotation to permit continuous purging without excess leakage of purging fluid.

A catalyst supply tube 92 independently traversing the upper end of the tubular extension 86 is provided with a series of branch ducts 94 that extend into alignment with the open ends of cells 52. The ends of the branch ducts 94 and the ends of the hoods similarly confront the end edge of the annular cell banks in sealing relation to limit flow through the ducts to the cell bank aligned therewith. By this arrangement a supply of discrete catalytic material admitted into supply tube 92 may be directed through ducts 94 into the cells 52 aligned with the hood 82. Upon opening valves 56, the discrete material may be withdrawn from cells 52 through hood 84 and duct 70 now shown closed with a removable plate means 76.

While a portion of the reactor is being embraced by hood members 82 and 84, the remaining reactor cells 52 lying in that portion of the reactor not embraced by the hoods is continuously traversed by a flow of flue gas that enters the reactor through inlet 72 and is exhausted, after passing through the cells of catalytic material, through an outlet 74.

A heater 102 interposed in the purge gas duct 83 permits heating the dry purge gas supplied through inlet 96 to a predetermined temperature as may be required to more effectively purge the catalyst of its contaminants or otherwise heat the catalyst preparatory to placing the apparatus in operation. Thus a commonly used catalyst vanadium pentoxide may be preheated to a temperature of 700° F. to 750° F. before it is subjected to the flow of flue gas under normal operating conditions.

To facilitate heating the catalyst in cells 52 preparatory to placing the reactor 40 in operation, valve means 106 leading back to duct 34 is closed and valve 104 is opened to permit recirculation of the purge gas back to the heater 102 in order that "make-up" heat may be added thereto to compensate for the heat absorbed by the catalyst. After the catalyst has been heated to a predetermined temperature the valve means 104 is closed and valve means 106 is opened in order that purge fluid from reactor 40 bearing contaminants picked up when traversing the contaminated catalyst cells 52 is admitted to the exhaust duct 34 in advance of the dust collector 38.

Under various conditions purging may be more effective if the purge gas is continuously heated before it is supplied to the reactor 40. Usually however when operating conditions have been attained, the heater 102 is deactivated and heat of the reaction will maintain a sufficiently high temperature.

When operating normally, flue gas bearing a quantity of sulphur dioxide is exhausted from boiler 32 through duct 34 to a dust collector 38 where particulate matter is removed from the gas before it passes to the catalystic reactor 40. In the catalytic reactor the flue gas traverses those catalyst cells 52 not embraced by hoods 82 and 84. While traversing the catalyst in cells 52, the sulphur dioxide of the flue gas is oxidized to sulphur trioxide while heat of the flue gas and heat of the reaction maintains the temperature of the catalyst at optimum levels.

In the preheater 36 the sulphur trioxide formed in the reactor readily combines with water in the flue gas at the lower temperature to form a solution of sulphuric acid and a mist thereof which may be removed from the flue gas in an acid mist collector 42 or equivalent apparatus. Substantially sulphur-free flue gas is then directed to a stack 44 for exhausting to the atmosphere.

If the catalytic material contained in cells 52 should become contaminated to the extent that the efficiency of the process were substantially lowered and available purge means is no longer effective to return the catalyst to its original condition, valves 56 at the bottom of the cells 52 may be opened to permit the spent catalyst to fall through hood 84 to the duct 70. Removal of the plate member 76 permits removal of the catalyst from the reactor. After closing valves 56 a supply of new or reactivated catalyst may be supplied to each of the cells 52 aligned with supply tube 92 and the branch ducts 82.

While this invention has been described with reference to the arrangement illustrated in the drawing, it is evident that various changes may be made without departing from the spirit of the invention. It is accordingly intended that all matter contained in the above description or shown in the accompanying drawings shall be interpreted as illustrative and not in a limiting sense.

I claim:

1. A catalytic reactor having an outer housing with axially spaced inlet and outlet ports for a reaction fluid, an inner casing positioned within said housing arranged to provide upper and lower end chambers and an annular space therebetween, partition members extending radially between the inner casing and the outer housing to divide the annular space into a series of sectorial compartments, a plurality of perforate cells extending axially through said compartments in radially spaced relation to provide axial passageways lying therebetween, means extending between adjacent perforate cells adapted to direct the flow of fluid therethrough, a quantity of discrete material carried by each of said perforate cells, upper and lower hood members in the upper and lower end chambers rotatably mounted in a common central axis having open ends that simultaneously confront opposite ends of said compartments and spaced ports for the supply and exhaust for a purging fluid, means for rotating said hood members about their common axis, independent conduit means extending into the upper hood having branch ducts that confront the end of each perforate cell to supply said discrete material thereto, and movable closure means at the lower end of each cell adapted for movement to a position permitting the discrete material of each cell to fall into the lower hood.

2. A system for the removal of sulphur dioxide from flue gas comprising a boiler, a catalytic reactor having a plurality of compartments each containing a catalyst that accelerates the oxidizing of sulphur dioxide to sulphur trioxide, duct means directing the flue gas from the boiler through a first portion of the catalytic reactor, dust collecting means interposed in said duct means intermediate the catalytic reactor and the boiler, a source of purging fluid, a purge duct directing purging fluid from said source through a second portion of said catalytic reactor independent from the first portion, means enabling purging fluid to be passed into the second portion of said reactor for the purpose of reactivating the catalytic material therein while the flue gas is directed through the first portion of the reactor, a heating means interposed in said purge duct, and means directing said purging fluid from the reactor to said duct means in advance of the dust collecting means whereby particulate matter removed from the catalytic reactor by the purging fluid is removed from the purging fluid before it is circulated back to the reactor.

References Cited

UNITED STATES PATENTS

| | | | |
|---|---|---|---|
| 2,304,398 | 12/1942 | Campbell | 208—151 |
| 1,284,167 | 11/1918 | Welch | 23—172 X |
| 2,934,495 | 4/1960 | Worth. | |
| 3,246,961 | 4/1966 | Karlsson | 23—288.3 |

FOREIGN PATENTS 767,125  12/1957  Great Britain.

OTHER REFERENCES

A. E. Wells et al.: The Manufacture of Sulphuric Acid in the United States, Bureau of Mines Bulletin 184, pages 179–183 (1920).

MORRIS O. WOLK, *Primary Examiner.*

B. S. RICHMAN, *Assistant Examiner.*

U.S. Cl. X.R.

23—168; 252—411, 416; 208—150, 151